US011184260B2

(12) United States Patent
Vincent et al.

(10) Patent No.: US 11,184,260 B2
(45) Date of Patent: Nov. 23, 2021

(54) METHOD AND SYSTEM FOR DETERMINING NETWORK CONGESTION LEVEL AND SYNCHRONIZING CLOCK USING PRECISION TIME PROTOCOL

(71) Applicant: Wipro Limited, Bangalore (IN)

(72) Inventors: Jimmy Vincent, Ammadam (IN); Basil Joseph, Ernakulam (IN)

(73) Assignee: Wipro Limited, Bangalore (IN)

( * ) Notice: Subject to any disclaimer, the term of this patent is extended or adjusted under 35 U.S.C. 154(b) by 67 days.

(21) Appl. No.: 16/835,455

(22) Filed: Mar. 31, 2020

(65) Prior Publication Data
US 2021/0258234 A1  Aug. 19, 2021

(30) Foreign Application Priority Data
Feb. 17, 2020  (IN) .............................. 202041006849

(51) Int. Cl.
*H04L 12/26* (2006.01)
*H04L 12/841* (2013.01)

(52) U.S. Cl.
CPC ........ *H04L 43/067* (2013.01); *H04L 43/0864* (2013.01); *H04L 43/0894* (2013.01); *H04L 43/106* (2013.01); *H04L 47/283* (2013.01)

(58) Field of Classification Search
None
See application file for complete search history.

(56) References Cited

U.S. PATENT DOCUMENTS

| | | | | |
|---|---|---|---|---|
| 7,330,429 B2* | 2/2008 | Beckstrom | .............. | H04L 47/10 370/230 |
| 7,760,642 B2* | 7/2010 | Plamondon | ............. | H04L 47/27 370/235 |
| 7,821,958 B2 | 10/2010 | Smith et al. | | |
| 8,400,911 B2 | 3/2013 | Smith et al. | | |
| 2005/0286416 A1* | 12/2005 | Shimonishi | ......... | H04L 47/2416 370/229 |

(Continued)

OTHER PUBLICATIONS

Kim, H., "Modeling and Tracking Time-Varying Clock Drifts in Wireless Networks", Georgia Institute of Technology, 2014, 129 pages.

*Primary Examiner* — Ranodhi Serrao
(74) *Attorney, Agent, or Firm* — Finnegan, Henderson, Farabow, Garrett & Dunner, LLP

(57) ABSTRACT

The disclosure relates to method and system for determining network congestion level. The method includes determining a round trip time (RTT) for each high priority and for each low priority packet transaction in the precision time protocol (PTP) protocol. The high priority and the low priority packet transactions are conducted between a master device and a slave device within a pre-defined time window. The method further includes determining an average high priority RTT and an average low priority RTT based on the RTT for each high priority packet transaction and for each low priority packet transaction respectively, computing an average delta RTT based on a difference between the average high priority RTT and the average low priority RTT, and determining an instantaneous network congestion level based on the average delta RTT and a reference delta RTT for a number of pre-defined time windows since a start of the slave device.

15 Claims, 5 Drawing Sheets

(56) References Cited

U.S. PATENT DOCUMENTS

| | | | |
|---|---|---|---|
| 2006/0088024 A1* | 4/2006 | Beckstrom | H04L 47/2433 370/351 |
| 2008/0225721 A1* | 9/2008 | Plamondon | H04L 47/193 370/235 |
| 2010/0085989 A1* | 4/2010 | Belhadj | H04J 3/0667 370/503 |
| 2010/0085990 A1* | 4/2010 | Belhadj | H04J 3/0667 370/517 |
| 2010/0220588 A1* | 9/2010 | Plamondon | H04L 47/10 370/230 |
| 2010/0226247 A1* | 9/2010 | Plamondon | H04L 47/10 370/229 |
| 2010/0226250 A1* | 9/2010 | Plamondon | H04L 47/10 370/230 |
| 2011/0013516 A1* | 1/2011 | Black | H04L 69/16 370/236 |

* cited by examiner

METHOD AND SYSTEM FOR DETERMINING NETWORK CONGESTION LEVEL AND SYNCHRONIZING CLOCK USING PRECISION TIME PROTOCOL

TECHNICAL FIELD

This disclosure relates generally to device synchronization; and more particularly to method and system for determining network congestion level and synchronizing clock using precision time protocol (PTP).

BACKGROUND

Network Congestion in a communication network occurs when more data is carried by a network node or a link than what the network node or the link can handle and results in reduced quality service. Network congestion may result in a number of issues including, but not limited to; queuing delay; packet loss, blocking of new connections. Such issues may sometime interfere with proper functioning of network devices. For example, as will be described herein below, the network congestion may result in ineffective synchronization between the master device and the slave device.

As will be appreciated, there are many techniques employed by a communication network (e.g., 4G, 5G backhaul and fronthaul, etc.) to perform device synchronization. One such technique may involve Precision Time Protocol (PTP) synchronization (sync) mode to keep time, phase and frequency synchronized across devices (e.g., IoT devices, medical devices, power grids, etc.) in the communication network. The PTP sync is achieved between a master device and a slave device by: a) the master device dynamically sharing an accurate time information with the slave device, b) the slave device dynamically determining a Round Trip Time/delay (RTT) with the master device at regular intervals, and c) the slave device setting/adjusting an appropriate time based on the time received from master device and the RTT determined by the slave device. The setting/adjusting of the time may be performed with the help of an PTP-Daemon (PTP-d) and PTP-servo running at the slave device. As will be appreciated, typically, the slave device has a cheaper or less accurate device clock, which deviates much with respect to the master device. This clock deviation (also referred to as clock skew) is primarily caused due to ageing and temperature effects on slave clock. Thus, for the device synchronization, only the time error due to the clock skew at the slave device may be adjusted by the PTP-d running at the slave device.

It may be critical for the PTP-d running at the slave device to accurately determine the RTT, so as to set the accurate time at the slave device. However, due to network congestion and associated path delays between the master and the slave device, accurate determination of the RTT is challenging. Thus, the path delays must be considered or accounted for prior to setting/adjusting the time at the slave device. However, the RTT varies from time to time due to two main factors: a) network congestion or disruptions (i.e., network variations (NV)) that may result in packet delay variations (PDVs), and b) clock deviation at the slave device. The clock correction in the slave device should be based on clock deviation/skew. Hence, it is important to eliminate the PDVs, caused due to the network disruption/congestion, from the RTT determination before determining the time adjustments required at the slave device.

As will be appreciated, many of the existing techniques does not have a deterministic mechanism to detect the PDVs due to network congestion. Therefore, there is a need of a mechanism that may dynamically detect the network congestion that may cause the PDVs, and then dynamically filter those PDVs from the RTT so as to determine an exact time to be adjusted at the slave device due to clock deviation.

SUMMARY

In one embodiment, a method for determining network congestion level using precision time protocol (PTP) is disclosed. In one example, the method may include determining a round trip time (RTT) for each of a plurality of high priority packet transactions in the PTP protocol and an RTT for each of a plurality of low priority packet transactions in the PTP protocol. It should be noted that the plurality of high priority packet transactions and the plurality of low priority packet transactions are conducted between a master device and the slave device within a pre-defined time window. The method may further include determining an average high priority RTT based on the RTT for each of the plurality of high priority packet transactions and an average low priority RTT based on the RTT for each of the plurality of low priority packet transactions. The method may further include computing an average delta RTT based on a difference between the average high priority RTT and the average low priority RTT. The method may further include determining an instantaneous network congestion level based on the average delta RTT and a reference average delta RTT for a plurality of pre-defined time windows since a start of the slave device.

In another embodiment, a system for determining network congestion level PTP is disclosed. In one example, the system may include a processor and a memory communicatively coupled to the processor, wherein the memory stores processor-executable instructions, which, on execution, may cause the processor to determine an RTT for each of a plurality of high priority packet transactions in the PTP protocol and an RTT for each of a plurality of low priority packet transactions in the PTP protocol. It should be noted that the plurality of high priority packet transactions and the plurality of low priority packet transactions are conducted between a master device and the slave device within a pre-defined time window. The processor-executable instructions, on execution, may further cause the processor to determine an average high priority RTT based on the RTT for each of the plurality of high priority packet transactions and an average low priority RTT based on the RTT for each of the plurality of low priority packet transactions. The processor-executable instructions, on execution, may further cause the processor to compute an average delta RTT based on a difference between the average high priority RTT and the average low priority RTT. The processor-executable instructions, on execution, may further cause the processor to determine an instantaneous network congestion level based on the average delta RTT and a reference average delta RTT for a plurality of pre-defined time windows since a start of the slave device.

In yet another embodiment, a non-transitory computer-readable storage medium, storing computer-executable instructions for determining network congestion level PTP, is disclosed. The stored instructions, when executed by a processor, may cause the processor to perform operations including determining an RTT for each of a plurality of high priority packet transactions in the PTP protocol and an RTT for each of a plurality of low priority packet transactions in the PTP protocol. It should be noted that the plurality of high priority packet transactions and the plurality of low priority packet transactions are conducted between a master device and the slave device within a pre-defined time window. The operations further include determining an average high priority RTT based on the RTT for each of the plurality of high priority packet transactions and an average low priority RTT based on the RTT for each of the plurality of low priority packet transactions. The operations further include computing an average delta RTT based on a difference between the average high priority RTT and the average low priority RTT. The operations further include determining an instantaneous network congestion level based on the average delta RTT and a reference average delta RTT for a plurality of pre-defined time windows since a start of the slave device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
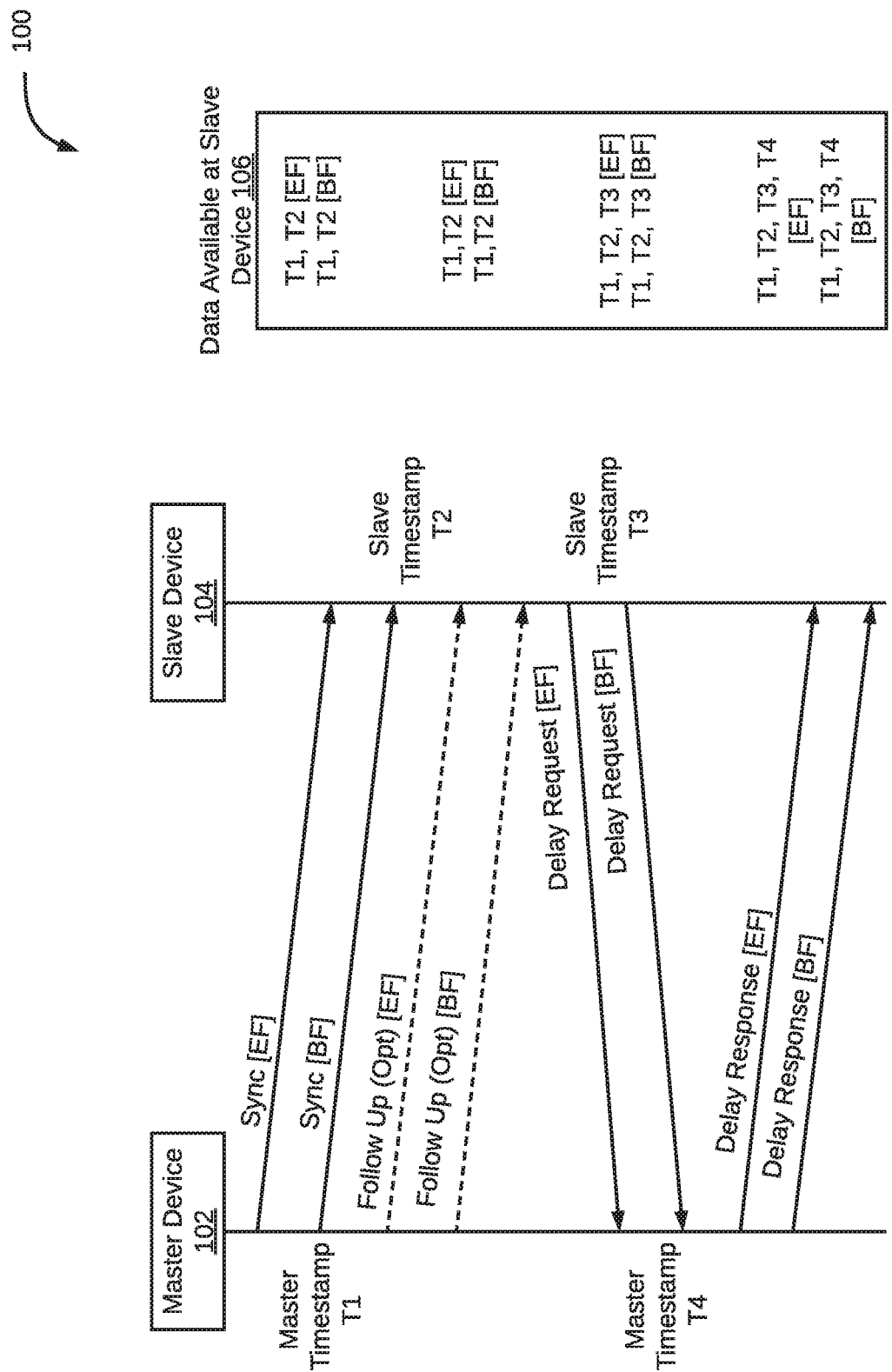
FIG. 1 illustrates an exemplary mechanism or determining network congestion level using precision time protocol (PTP), in accordance with some embodiments of the present disclosure.

Referring now to FIG. 1, an exemplary mechanism for determining network congestion level using precision time protocol (PTP) is illustrated, in accordance with some embodiments of the present disclosure. In particular, the mechanism 100 provides for detection of a network congestion intensity experienced at a precision time protocol (PTP) packet path between a master device 102 and a slave device 104. The mechanism 100 may dynamically detect a level of congestion in a network based on variations in a round trip time (RTT) for different PTP packet transactions involving different PTP packet types with different priorities. It should be noted that, each of the PTP packet transaction may include transmission of a synchronization (sync) packet (also referred to as sync message), a delay request packet (also referred simply as delay request), and a delay response packet (also referred simply as delay response) between the master device 102 and the slave device 104. The different PTP packet types may be defined based on differentiated services code point (DSCP) priorities in an Internet protocol (IP) domain. The PTP packets may be transmitted based on the associated DSCP values as high priority (HP) packets (with low sensitivity to the network congestion) or a (LP) low priority packets (with high sensitivity to the network congestion).

In some embodiments, the HP packets may correspond to expedited forwarding (EF) packets with least sensitivity (i.e., least impacted) to an instantaneous network congestion. Further, in some embodiments, the LP packets may correspond to best effort forwarding (BF) packets with highest sensitivity (i.e., most impacted) to an instantaneous network congestion. In some embodiments, the LP packets may correspond to assured forwarding (AF) packets with high sensitivity to an instantaneous network congestion. It should be noted that a delay variation of the BF/AF packets is quite high and may exponentially increases as compared to the EF packets. For the EF packets the delay variation increases very minimally during a high congestion scenario vis-à-vis a non-congestion scenario.

Moreover, the EF packets and the BF packets may be transmitted one or more times between the master device 102 and the slave device 104 within a pre-defined time window. The mechanism 100 represents the PTP packet flow of the EF packets and the BF packets between the master device 102 and the slave device 104 within the pre-defined time window. Further, the RTT for a transaction involving a set of EF packets (referred to as EF packet transaction) and the RTT for a transaction involving a set of BF packets (referred to as BF packet transaction) may be determined at the slave device 104 with respect to the master device 102. As stated above, each EF packet transaction and each BF packet transaction may involve a sequence of three steps. A first step of the EF transaction and the BF transaction may involve sending of the sync packet for each of the EF and BF packet types (i.e., a Sync [EF] and a sync [BF]) from the master device 102, at a respective first time stamp T1 (i.e., T1[EF] and T1[BF]), to the slave device 104. The slave device 104 may receive each of these sync packets (i.e., a Sync [EF] and a sync [BF]) at a respective second time stamp T2 (e T2[EF] and T2[BF]). Thus, based on the sync [EF] and the sync [BF], the slave device 104 may become aware of the timestamps T1[EF] and T1 [BF] and the timestamps T2[EF] and T2[BF]. The slave device 104 may then generate delay request packets (i.e., a delay request [EF] and a delay request [BF]) corresponding to the sync packets (i.e., the sync [EF] and the sync [BF]). A second step of the EF transaction and the BF transaction may involve sending of each of the delay request packets (i.e., the delay request [EF] and the delay request [BF]) from the slave device 104, at a respective third timestamp T3 (i.e., T3[EF] and T3[BF]), to the master device 102. The master device 102 may receive each of these delay request packets (i.e., the delay request [EF] and the delay request [BF]) at a respective fourth timestamp T4 (i.e., T4[EF] and T4[BF]). The master device 102 may then generate delay response packets (i.e., a delay response [EF] and a delay response [BF]) corresponding to the delay request packets (i.e., the delay request [EF] and the delay request [BF]). A third step of the EF transaction and the BF transaction may involve sending of each of the delay response packets (i.e., the delay response [EF] and the delay response [BF]) from the master device to the slave device 104. Thus, based on the delay request [EF], the delay request [BF], the delay response [EF], and the delay response [BF], the slave device 104 may become aware of timestamps T3[EF] and T3[BF] and the timestamps T4[EF] and T4[BF]. Now, the timestamps T1 T2, T3, T4 with respect to the set of EF packets in each EF transaction and the BF packets in each BF transaction may be represented by a block 106. This data available at the slave device 106 will enable the slave device to determine network congestion level and perform clock synchronization.

In an embodiment, the transaction may be usually configured from about 2 transactions per second (tps) to about 128 tps. Moreover, each of the transaction—the sequence from step 1 (i.e., sending of the sync packet from the master device 102) to step 3 (i.e., the receiving of the delay response packet by the slave device 104—may be configured for a fixed rate in a second. In addition, the one or more transactions may happen within any pre-defined time window. The pre-defined time window may correspond to a time interval during which the one or more such transactions may happen. In an embodiment, the predefined window period may also be termed as a congestion window period (CWP). Further, at the end of each transaction in a given pre-defined window; the RTT value may be calculated based on the timestamps T1, T2, T3, T4 with respect to the EF transaction and the BF transaction. Based on the RTT value calculated for each transaction with same DSCP value, an average RTT may be calculated for the given pre-defined time window. Therefore, two average RTT may be generated for the EF transaction and the BF transaction for the given predefined time window. By way of an example, the two average RTT corresponding to transactions having the EF packets and the BF packets may be represented as an average RTT(EF) and an average RTT (BF). Thereafter, an average delta RTT may be determined based on difference between the average RTT(EF) and the average RTT(BF) for the given predefined time window. Thereafter, based on the average delta RTT and a reference average delta RTT, an instantaneous network congestion level may be determined for the given pre-defined time window. The instantaneous network congestion level may correspond to a congestion level (CL) in the network during the given pre-defined time window. It should be noted that the reference average delta RTT may be selected from among a plurality of average delta RTTs for a plurality of pre-defined time windows since a start of the slave device. For example, in some embodiments, the reference average delta RTT corresponds to a lowest among the plurality of average delta RTTs corresponding to each of the plurality of pre-defined time windows since the start of the slave device. It should be noted that the lowest RTT may correspond with an instance with lowest network congestion since the start of the slave device.

Once the instantaneous network congestion is determined, a clock correction value (CCV) at the slave device 104 may be generated. It should be noted that the clock correction may be generated based on any generic Digital-Phase-Locked-Loop (DPLL) systems damped for the instantaneous network congestion. In a scenario, when a high network congestion happens, then an error in the RTT determined for each of the transaction in any given pre-defined time windows may be more. This may result in the error observed at the clock of the slave device 104 and in the CCV generated by the slave device 104. Thus, the damped intensity of the DPLL systems may be increased over the CCV. This may reduce an influence of correction and in turn reduces an influence of network congestion on device synchronization.

Figure 2:
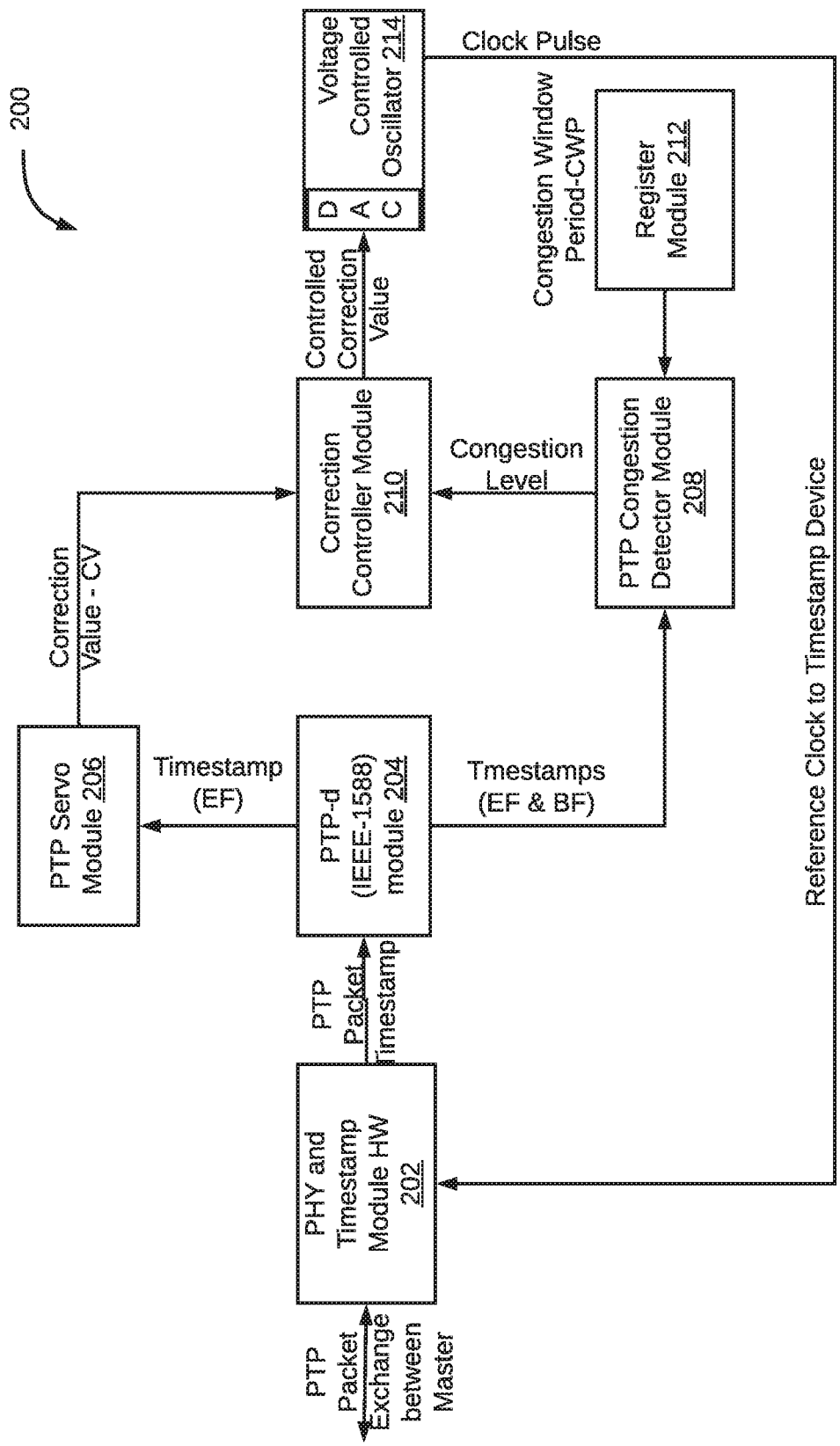
FIG. 2 is a functional block diagram of an exemplary slave device for determining network congestion level using PTP, in accordance with some embodiments of the present disclosure.

Referring now to FIG. 2, a functional block diagram of an exemplary slave device for determining network congestion level using precision time protocol (PTP) is illustrated, in accordance with some embodiments of the present disclosure. The system 200 represents various modules of the exemplary slave device. In reference to FIG. 1, the exemplary slave device may correspond to the slave device 104. The system 200 may include a PHY and timestamp module (HW) 202 a PTP-d (IEEE-1588) module 204, a PTP servo module 206, a PTP congestion detector module 208, a correction controller module 210, a register module 212, and a digital to analog converter (DAC) and voltage controlled oscillator (VCO) 214.

The PHY and timestamp module (HW) 202 may act as a physical layer interface that may be responsible to look with peer for each of a packet termination. The major functionality of the PHY and timestamp module (HW) 202 may involve sending, receiving, and timestamping of a plurality of PTP packets though a physical medium. In particular, the PHY and timestamp module (HW) 202 may include a PHY module and a timestamp module. The PHY module may act as the physical medium to send and receive the plurality of PTP packets. Additionally, the timestamp module may timestamp each of the plurality of PTP packets. The plurality of PTP packets may include the EF packets and the BF packets. The time stamping by the PHY and timestamp module (HW) 202 may be based on a time stamp counter run by a clock of the slave device. In an embodiment, at the slave device the PHY and timestamp module (HW) 202 may timestamps the PTP-sync packets, i.e., the sync [EF] and the sync [BF] at the slave device 104 while receiving it. By way of an example, the timestamps for the PTP sync packets and may include T1[EF] and T2[EF] for the sync [EF], and T1[BF] and T2[BF] for the sync [BF]. Similarly, the PHY and timestamp module (HW) 202 may also timestamps the delay request packets, i.e., the delay request packet [EF] and the delay request packet [BF] at the slave device 104 while sending it. Example of the PHY and timestamp module (HW) 202 may include but is not limited to a broadband ethernet PHY device.

The PTP-d (IEEE-1588) module 204 may act as a PTP protocol stack at the slave device 104. The PTP-d (IEEE-1588) module 204 may compose egress PTP packets (i.e., the delay request packets) and may parser ingress packets (i.e., the sync packets as well as the delay response packets) based on IEEE1588v2. It should be noted that, in any existing general implementations a default Internet Protocol (IP) priority/DSCP for each of the plurality of PTP packets is the EF. Additionally, number of the plurality of PTP packets send per second may be configurable. In conjunction to the present disclosure, the PTP-d (IEEE-1588) module 204 may be modified to compose PTP delay packets of the BF DSCP value. Further, the PTP-d (IEEE-1588) module 204 may be modified to parse PTP sync packets of the BF DSCP value. In addition, a rate of PTP delay packets of the BF DSCP value may be configured per second. The PTP servo module 206 may include a PTP control value generation algorithm for generating a correction value (CV). The PTP control value generation algorithm may generate the CV based on a timestamp received as input for the pre-defined time window. The timestamp received as input may only include the timestamp corresponding to the EF packets for the pre-defined time window. In reference to FIG. 1, the timestamps corresponding to the EF packets for the predefined time window may include T1[EF], T2[EF], T3[EF], and T4[EF]. In addition, the PTP servo module 206 are generally proprietary.

The PTP congestion detector module 208 may determine the RTT for the EF packets and the BF packets for the pre-defined time window. The PTP congestion detector module 208 may then determine the average RTT for transactions having the EF packets within the pre-defined time window. The average RTT for transactions having the EF packets may be represented as the average RTT (EF) In reference to FIG. 1, the average RTT (EF) may be determined based on an equation (1) given below:

$$RTT(EF)=(T2-T1)+(T4-T3) \qquad (1)$$

Similarly, the PTP congestion detector module 208 may also determine the average RTT for transactions having the BF packets within the pre-defined time window. The average RTT for transactions having the BF packets may be represented as the average RTT (BF). In reference to FIG. 1, the average RTT for transactions having the BF packets may be determined based on an equation (2) given below:

$$RTT(BF)=(T2-T1)+(T4-T3) \qquad (2)$$

Based on the average RTT (EF) and the average RTT (BF), the PTP congestion detector module 208 may determine the average delta RTT at an end of the pre-defined time window. The average delta RTT may be represented as RTT (d). The average delta RTT, i.e., the RTT (d) may be determined using an equation (3) given below:

$$RTT(d)=RTT(BF)-RTT(EF) \qquad (3)$$

It should be noted that, in a normal IP network the RTT (BF) may be always greater than the RTT (EF). Thereafter, the PTP congestion detector module 208 may determine the instantaneous network congestion based on the average delta RTT i.e. the RTT (d) and the reference average delta RTT. In an embodiment, the instantaneous network congestion may correspond to a congestion level (CL). The reference average delta RTT may be represented as the RTT (dL) respectively. Further, the instantaneous network congestion, i.e., the congestion level (CL) may be determined based on an equation (4) represented below:

$$CL=\{RTT(d)-RTT(dL)\}/RTT(dL) \qquad (4)$$

The correction controller module 210 may take as input the CV generated by the PTP servo (IEEE 1588) module 206 and damps the CV. The correction controller module 210 may take as input the CL determined by the PTP congestion detector module 208. Based on the CV and the determined CL, the correction controller module 210 may determine a controlled correction value (CCV). It should be noted that, in case if the CL<0, then the correction controller module 210 may assigned itself a value '0'. Further, the CCV may be determined based on an equation (5) given below:

$$CCV=CV/(1+CL) \qquad (5)$$

The register module 212 may include a user configured value for the pre-defined time window. In reference to FIG. 1, the pre-defined time window may correspond to the congestion window period (CWP). The congestion window period may be defined as the time interval during which one or more such transactions happens. In addition, for the congestion window period the average RTT (EF) and the average RTT (BF) may be determined.

The DAC and VCO module 214 may generate a voltage corresponding to the CCV determined. Further, based on the voltage generated corresponding to the CCV, the DAC and VCO module 214 may adjust a frequency of the clock at the slave device for the pre-defined time window.

Figure 3:
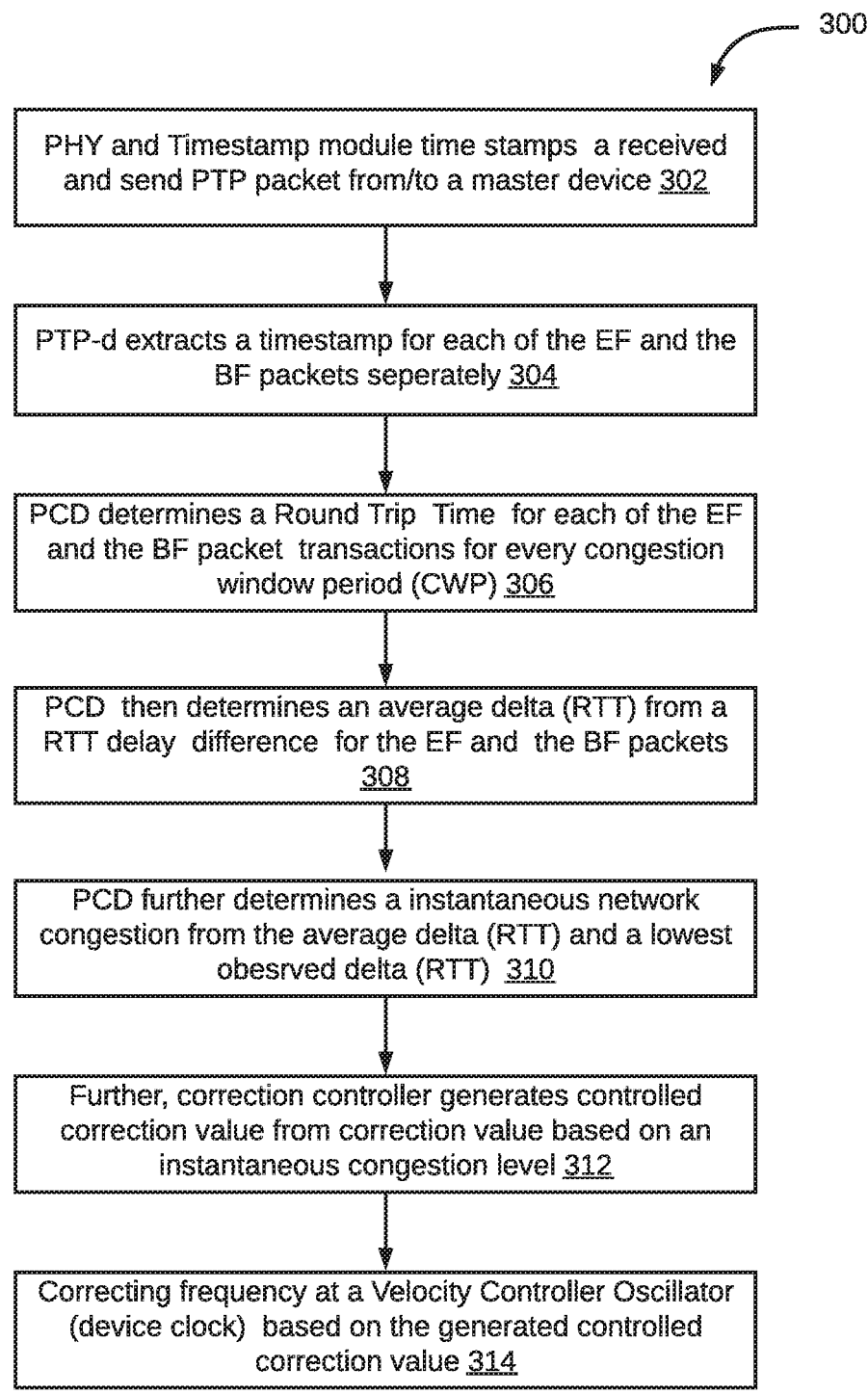
FIG. 3 is a flow diagram of a detailed exemplary process overview determining network congestion level using PTP, in accordance with some embodiments of the present disclosure.

Referring now to FIG. 3, a flow diagram of a detailed exemplary process for determining network congestion level using precision time protocol (PTP) is depicted via a flowchart, in accordance with some embodiments of the present disclosure. At step 302, the PHY and timestamp module 202 may receive and send the plurality of PTP packets from a PTP master. Based on the plurality of PTP packets, a PTP packet frequency, i.e., packets per second may be configured for the EF and the BF packets. Once the PTP packet frequency is configured then a duration (the pre-defined time window) may be configured during which the RTT may be needed to be averaged for the EF and the BF packets. Thereafter, based on the configuration of the EF and the BF packets and the duration of the pre-defined time window, a communication between the master device 102 and the slave device 104 may occur for the plurality of PTP packets. Additionally, in this step, the PHY and timestamp module (HW) 202 may generate the timestamp. Moreover, the timestamp may be driven by a counter which may be derived from the clock of the slave device 104. The counter generates the timestamp when the ingress (the delay packets) or the egress (the sync packets) PTP packets may be received. Thereafter, at step 304, the PTP-d (IEEE-1588) 204 may extract the timestamp based on the transactions for each of the EF and the BF packets separately for the pre-defined time window. In an embodiment, the timestamp extracted for the pre-defined window period corresponding to each of the EF packets may include T1 [EF], T2 [EF], T3 [EF], and T4 [EF]. Similarly, the timestamp extracted for the pre-defined window period corresponding to each of the BF packets may include T1 [BF], T2 [BF], T3 [BF], and T4 [BF]. The timestamps corresponding to each of the EF and the BF packets may be shared with the PTP congestion detector module 208 and the PTP servo module 206. In this step, the PTP servo module 206 may generate the CV based on the timestamps corresponding to each of the EF packets for each of the plurality of pre-defined time windows. Further, the CV generated is shared with the correction controller module 210.

At step 306, the PTP congestion detector module 206 may determine the average RTT for the EF packets and the BF packets, i.e., the RTT (EF) and RTT (BF) for the pre-defined time window. For this, the PTP congestion detector module 206 may read a user configured CWP value from the register module 212, The average RTT corresponding to the EF packets for the pre-defined time window may be determined as follows: an uplink time is determined from the averaged values of the T3 [EF] and the T4[EF] at the end of the pre-defined time window as, Uplink Delay=T4[EF]-T3 [EF]. Similarly, a downlink time is determined from the averaged values of the T1[EF] and the T2[EF] at the end of the pre-defined time window as, Downlink Delay=T2[EF]-T1[EF]. Further, the RTT(EF) at the end of the pre-defined window period may be determined as, RTT (EF)=Uplink Delay+Downlink Delay.

Similarly the average RTT corresponding to the BF packets for the pre-defined time window may be determined as follows: an uplink time is determined from the averaged values of the T3 [BF] and the T4[BF] at the end of the pre-defined time window as, Uplink Delay=T4[BF]-T3 [BF]. Similarly, a downlink time is determined from the averaged values of the T1 [BF] and the T2[BF] at the end of the pre-defined time window as, Downlink Delay=T2[BF]-

T1 [BF]. Further, the RTT(BF) at the end of the pre-defined window period may be determined as, RTT (BF)=Uplink Delay+Downlink Delay.

At step 308, the average delta RTT, i.e., the RTT(d) may be determined based on the average RTT (EF) and the average RTT (BF) using the equation (3) given above. At step 310, the instantaneous network congestion may be determined by the PTP congestion detector module 208 based on the average delta RTT, i.e., the RTT (d) and a lowest observed delta RTT. The lowest observed delta RTT may correspond to the reference average delta RTT, i.e., RTT (dL). The equation (4) given above may be used to determine the instantaneous network congestion Thereafter, at step 312, the CCV value may be generated based on the CV from the PTP servo (IEEE 1588) module 206 and the CL from the PTP congestion detector module 208. The CCV may be generated as per the equation (5) given above. Thereafter, at step 314, based on the generated CCV, the frequency correction is done at the clock of the slave device 104. For correcting the frequency, the voltage corresponding to the CCV may be generated.

Figure 4:
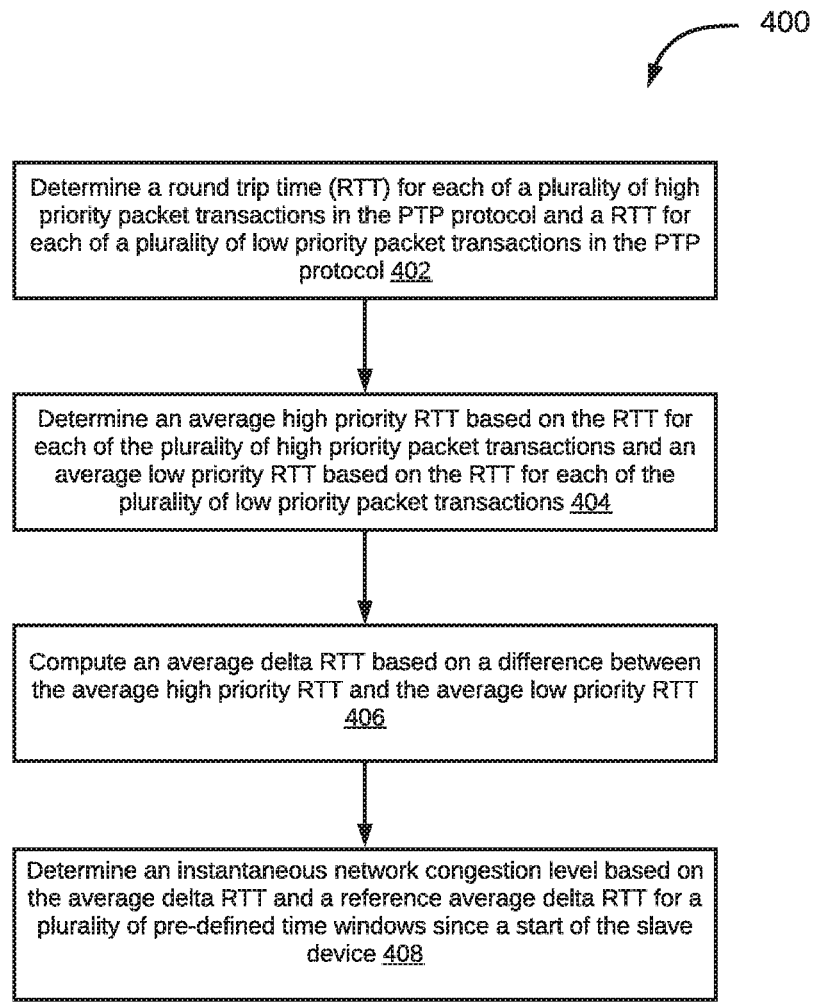
FIG. 4 is a flow diagram of an exemplary process for determining network congestion level using PTP, in accordance with some embodiments of the present disclosure

Referring now to FIG. 4, a flow diagram of an exemplary method for determining network congestion level using precision time protocol (PTP) is depicted via a flowchart, in accordance with some embodiments of the present disclosure. At step 402, the RTT may be determined for each of a plurality of high priority packet transaction and for each of a plurality of low priority transactions in the PTP protocol. Moreover, the plurality of high priority packet transactions and the plurality of low priority packet transactions may be conducted between the master device 102 and the slave device 104 within the pre-defined time window. As stated above, the plurality of high priority packet transaction includes the expedited packet [EF] transaction. Similarly, the plurality of low priority packet transaction may include one of the best-effort forwarding (BF) packet or the assured forwarding (AF) packet. The pre-defined time window may also be termed as the CWP. At step 404, an average high priority RTT and an average low priority RTT may be determined based on the RTT for each of the plurality of high priority packet transactions and the RTT for each of the plurality of low priority packet transactions, respectively. The average high priority RTT may correspond to the average RTT for the EF packets, i.e., the RTT(EF). Similarly, the average low priority RTT may correspond to the average RTT for the BF packets, i.e., the RTT(BF). Based on the average high priority RTT and the average low priority RTT. At step 406, the average delta RTT may be determined. The average delta RTT may be determine based on a difference between the average high priority RTT and the average low priority RTT. The average delta RTT may correspond to the RTT(d) that may be determine as per the equation (3) given above. Thereafter, at step 408, the instantaneous network congestion may be determined based on the average delta RTT, i.e., RTT (d) and the reference delta RTT, i.e., RTT (dL). Further, the instantaneous network congestion, i.e., the congestion level (CL) may be determined as per the equation (4) given above.

Figure 5:
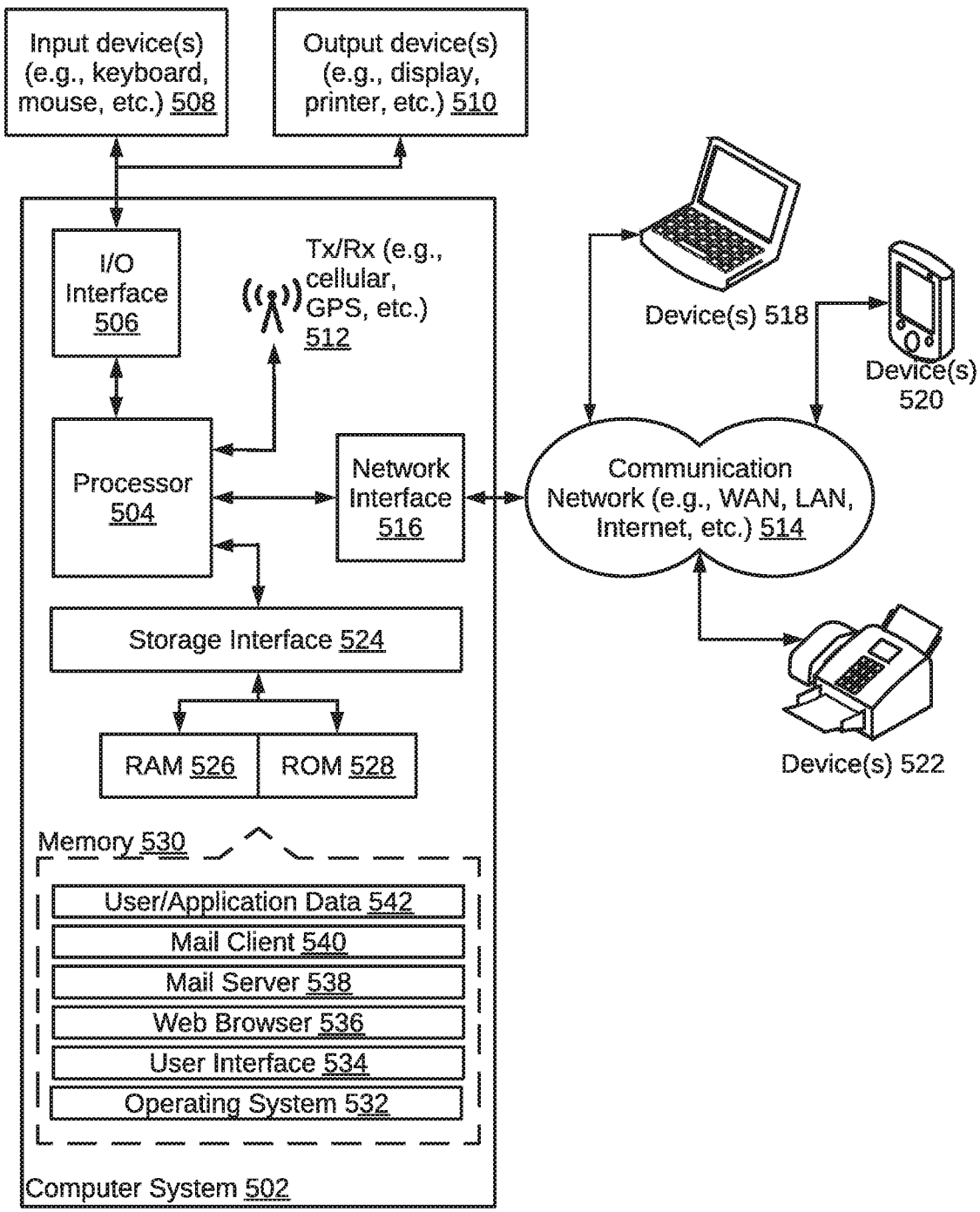
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 502 for implementing various embodiments consistent with the present disclosure is illustrated. Computer system 502 may include a central processing unit ("CPU" or "processor") 504. Processor 504 may include at least one data processor for executing program components for executing user or system-generated requests. A user may include a person, a person using a device such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 510 may be a printer, fax machine, video display (for example, cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (for example, using Wireless Application Protocol), the Internet, etc. Using network interface 516 and communication network 514, computer system 502 may communicate with devices 518, 520, and 522. These devices may include, without limitation, personal compute (s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 502 may itself embody one or more of these devices.

In some embodiments, processor 504 may be disposed in communication with one or more memory devices (for example, RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, user interface application 534, web browser 536, mail server 538, mail client 540, user/application data 542 (for example, any data variables or data records discussed in this disclosure), etc. Operating system 532 may facilitate resource management and operation of computer system 502. Examples of operating systems 532 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 502 may implement a web browser 536 stored program component. Web browser 536 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C#, MICROSOFT.NET® programming language, CGI scripts, JAVA® programming language, JAVASCRIPT® programming language, PERU® programming language, PHP® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL®, mail client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in various embodiments discussed above are not routine, or conventional, or well understood in the art. The techniques described in various embodiments discussed above provide for determining network congestion level and synchronizing clock using precision time protocol (PTP). The techniques further determine the RTT for each of the plurality of high priority packet transactions and for each of the plurality of low priority packet transactions within the pre-defined time windows. The techniques further determine the average high priority RTT and the average low priority RTT. The techniques further compute the average delta RTT based on the average high priority RTT and the average low priority RTT. The techniques further determine the instantaneous network congestion. The techniques further generate the CCV. The techniques further generate the voltage corresponding to the CCV generated. The techniques further adjust the frequency at the clock of the slave device based on the voltage generated.

In some embodiments, the techniques provide method and system for determining network congestion level and synchronizing clock using precision time protocol (PTP). The techniques provided helps to determine the network congestion in a unique way, based on the RTT variations for the different packet types having different DSCP values. The techniques provided helps in dynamic levels control/filter in correction towards the clock of the slave device only solely based on the network congestion levels. Further, the techniques provided is less complex and less CPU intensive as compared to an existing filtering mechanism based on various mathematical models. Example of the existing filtering mechanism may include, but is not limited to, a Kalman filter.

The specification has described method and system for determining network congestion level and synchronizing clock using precision time protocol (PTP). The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of determining network congestion level using precision time protocol (PTP), the method comprising:
    determining, by a slave device, a round trip time (RTT) for each of a plurality of high priority packet transactions in the PTP protocol and an RTT for each of a plurality of low priority packet transactions in the PTP protocol, wherein the plurality of high priority packet transactions and the plurality of low priority packet transactions are conducted between a master device and the slave device within a pre-defined time window;
    determining, by the slave device, an average high priority RTT based on the RTT for each of the plurality of high priority packet transactions and an average low priority RTT based on the RTT for each of the plurality of low priority packet transactions;
    computing, by the slave device, an average delta RTT based on a difference between the average high priority RTT and the average low priority RTT; and
    determining, by the slave device, an instantaneous network congestion level based on the average delta RTT and a reference average delta RTT for a plurality of pre-defined time windows since a start of the slave device,
    wherein the reference average delta RTT corresponds to a lowest among a plurality of average delta RTTs corresponding to each of the plurality of pre-defined time windows since the start of the slave device.

2. The method of claim 1, wherein determining the RTT for a high priority packet transaction in the PTP protocol comprises:
    receiving, by the slave device at a timestamp T2[HP], a high priority sync packet sent from the master device at a timestamp T1[HP];
    sending, by the slave device at a timestamp T3[HP], a high priority delay request packet to the master device in response to the receiving of the high priority sync packet;
    receiving, by the slave device, a high priority delay response packet sent from the master device in response to receiving of the high priority delay request packet by the master device at a timestamp T4[HP]; and
    determining, by the slave device, the RTT for the high priority packet transaction based on the timestamps T1[HP], T2[HP], T3[HP], and T4[HP].

3. The method of claim 1, wherein determining the RTT for a low priority packet transaction in the PTP protocol comprises:
    receiving, by the slave device at a timestamp T2[LP], a low priority sync packet sent from the master device at a timestamp T1[LP];
    sending, by the slave device at a timestamp T3[LP], a low priority delay request packet to the master device in response to the receiving of the low priority sync packet;
    receiving, by the slave device, a low priority delay response packet sent from the master device in response to receiving of the low priority delay request packet by the master device at a timestamp T4[LP]; and
    determining, by the slave device, the RTT for the low priority packet transaction based on the timestamps T1[LP], T2[LP], T3[LP], and T4[LP].

4. The method of claim 1, wherein the each of the plurality of high priority packet transactions comprises an expedited forwarding (EF) packet, and wherein the each of the plurality of low priority packet transactions comprises one of a best effort forwarding (BF) packet or an assured forwarding (AF) packet.

5. The method of claim 1, further comprising performing a PTP synchronization between the master device and the slave device based on the instantaneous congestion level, wherein the PTP synchronization comprises at least one of a time, a phase, and a frequency synchronization of a clock in the slave device.

6. The method of claim 5, wherein performing the PTP synchronization comprises generating, by the slave device, a controlled correction value (CCV) based on a final correction value and the instantaneous congestion level for the pre-defined time window, and wherein the final correction value is generated based on one or more timestamps associated with the plurality of high priority packet transactions within the pre-defined time window.

7. The method of claim 6, further comprising:
generating, by the slave device, a voltage corresponding to the CCV; and
adjusting, by the slave device, the frequency of the clock in the slave device for the pre-defined time window based on the generated voltage.

8. A system for determining network congestion level using precision time protocol (PTP), the system comprising:
a slave device comprising a processor and a memory communicatively coupled to the processor, wherein the memory stores processor-executable instructions, which, on execution, causes the processor to:
determine a round trip time (RTT) for each of a plurality of high priority packet transactions in the PTP protocol and an RTT for each of a plurality of low priority packet transactions in the PTP protocol, wherein the plurality of high priority packet transactions and the plurality of low priority packet transactions are conducted between a master device and the slave device within a pre-defined time window;
determine an average high priority RTT based on the RTT for each of the plurality of high priority packet transactions and an average low priority RTT based on the RTT for each of the plurality of low priority packet transactions;
compute an average delta RTT based on a difference between the average high priority RTT and the average low priority RTT; and
determine an instantaneous network congestion level based on the average delta RTT and a reference average delta RTT for a plurality of pre-defined time windows since a start of the slave device,
wherein the reference average delta RTT corresponds to a lowest among a plurality of average delta RTTs corresponding to each of the plurality of pre-defined time windows since the start of the slave device.

9. The system of claim 8, wherein the processor determines the RTT for a high priority packet transaction in the PTP protocol by:
receiving, at a timestamp T2[HP], a high priority sync packet sent from the master device at a timestamp T1[HP];
sending, at a timestamp T3[HP], a high priority delay request packet to the master device in response to the receiving of the high priority sync packet;
receiving a high priority delay response packet sent from the master device in response to receiving of the high priority delay request packet by the master device at a timestamp T4[HP]; and
determining the RTT for the high priority packet transaction based on the timestamps T1[HP], T2[HP], T3[HP], and T4[HP].

10. The system of claim 8, wherein the processor determines the RTT for a low priority packet transaction in the PTP protocol by:

receiving, at a timestamp T2[LP], a low priority sync packet sent from the master device at a timestamp T1[LP];
sending, at a timestamp T3[LP], a low priority delay request packet to the master device in response to the receiving of the low priority sync packet;
receiving a low priority delay response packet sent from the master device in response to receiving of the low priority delay request packet by the master device at a timestamp T4[LP]; and
determining the RTT for the low priority packet transaction based on the timestamps T1[LP], T2[LP], T3[LP], and T4[LP].

11. The system of claim 8, wherein the each of the plurality of high priority packet transactions comprises an expedited forwarding (EF) packet, and wherein the each of the plurality of low priority packet transactions comprises one of a best effort forwarding (BF) packet or an assured forwarding (AF) packet.

12. The system of claim 8, wherein the processor-executable instructions, on execution, further cause the processor to perform a PTP synchronization between the master device and the slave device based on the instantaneous congestion level, wherein the PTP synchronization comprises at least one of a time, a phase, and a frequency synchronization of a clock in the slave device.

13. The system of claim 12, wherein the processor performs the PTP synchronization by generating a controlled correction value (CCV) based on a final correction value and the instantaneous congestion level for the pre-defined time window, and wherein the final correction value is generated based on one or more timestamps associated with the plurality of high priority packet transactions within the pre-defined time window.

14. The system of claim 13, wherein the processor-executable instructions, on execution, further cause the processor to:
generate a voltage corresponding to the CCV; and
adjust the frequency of the clock in the slave device for the pre-defined time windows based on the generated voltage.

15. A non-transitory computer-readable medium storing computer-executable instructions for:
determining a round trip time (RTT) for each of a plurality of high priority packet transactions in a precision time protocol (PTP) protocol and an RTT for each of a plurality of low priority packet transactions in the PTP protocol, wherein the plurality of high priority packet transactions and the plurality of low priority packet transactions are conducted between a master device and a slave device within a pre-defined time window;
determining an average high priority RTT based on the RTT for each of the plurality of high priority packet transactions and an average low priority RTT based on the RTT for each of the plurality of low priority packet transactions;
computing an average delta RTT based on a difference between the average high priority RTT and the average low priority RTT; and
determining an instantaneous network congestion level based on the average delta RTT and a reference average delta RTT for a plurality of pre-defined time windows since a start of the slave device,
wherein the reference average delta RTT corresponds to a lowest among a plurality of average delta RTTs corresponding to each of the plurality of pre-defined time windows since the start of the slave device.

\* \* \* \* \*